Patented Oct. 11, 1932

1,881,487

UNITED STATES PATENT OFFICE

CHARLES W. GIRVIN, OF LONG BEACH, CALIFORNIA, ASSIGNOR, BY MESNE ASSIGNMENTS, TO GENERAL SALT COMPANY, OF LONG BEACH, CALIFORNIA, A CORPORATION OF CALIFORNIA

RECOVERY OF IODINE

No Drawing. Application filed February 21, 1927. Serial No. 170,055.

This invention is an extremely simple and economical method of recovering iodine from charcoal, it being well known that charcoal has such adsorptive and absorptive capacity for iodine as to readily adsorb it from natural brines and the like carrying iodides in solution. The natural iodides contained in brine may be converted to chemically free iodine by a suitable oxidizing agent, preferably sulphuric acid and sodium nitrite; and activated charcoal is then employed to adsorb the elementary iodine in solution in the brine, the charcoal becoming saturated with an amount of iodine equal to from 20 to 40% of its own weight depending upon its degree of activation.

Recovery of the free iodine from the charcoal presents difficulties, the methods heretofore suggested being either in the experimental stage or economically impractical; and it is therefore the object of the present invention to overcome these difficulties and provide a simple, convenient and inexpensive method for converting the elementary iodine to a form in which it is soluble in water and consequently readily washed from the charcoal. For this purpose the iodine adsorbed by the charcoal is converted to a water soluble iodide by a process which insures extraction of all the iodine from the charcoal but without extracting the various undesirable fatty acids, etc. which are always mixed with the iodine. The water soluble iodide is then washed from the charcoal and the wash water concentrated, so that the iodide may be readily converted to elementary iodine by the use of any suitable oxidizing agent, the necessary chemical reaction requiring only the simplest apparatus and inexpensive and commercially available material.

The process is based upon my discovery that the nascent hydrogen evolved by the characteristic reaction of an acid and a metal which will directly displace the hydrogen of the acid, will produce an iodide of the metal if elementary iodine is treated with a solution of the acid in the presence of the metal, and consequently by selecting a metal which will form a water soluble iodide, the iodine is converted to a form in which it may be washed from the charcoal. The use of an acid solution rather than simply water or an alkaline or neutral salt expedites the reaction and insures penetration of the solution and its consequent adsorption by the charcoal, and the solution thereby reacts with all of the iodine for converting it to a water soluble form, and the use of an acid solution avoids extraction of the undesirable fatty acids which are present with the iodine. As an example of a suitable metal and acid having this characteristic reaction iron and a mineral acid such as dilute sulphuric acid or hydrochloric acid may be cited; and in practical operation these are the materials preferably employed since they are inexpensive and readily available in commercial quantities.

The charcoal containing elementary iodine is treated in a solution of either the dilute sulphuric acid or hydrochloric acid in the presence of the iron; and the resulting reaction by liberating nascent hydrogen forms a ferrous salt and converts the iodine to ferrous iodide which is water soluble and readily washed from the charcoal. The reaction is expressed in the following equations:

With dilute sulphuric acid—

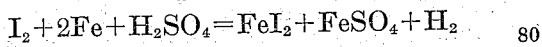
$$I_2 + 2Fe + H_2SO_4 = FeI_2 + FeSO_4 + H_2$$

With hydrochloric acid—

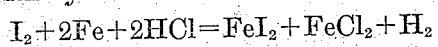
$$I_2 + 2Fe + 2HCl = FeI_2 + FeCl_2 + H_2$$

The ferrous iodide produced by the reaction may be easily washed from the charcoal since it is readily soluble in water, and may then be separated from the ferrous salt and converted to elementary iodine by a suitable oxidizing agent.

While an acid solution such as described will penetrate and be completely adsorbed by the charcoal without resorting to agitation, I have found that the chemical reaction may be advantageously expedited by subjecting the acid solution to heat and agitation; and in practice I have found a convenient method of agitating and applying heat and at the same time presenting the necessary metal for the reaction to consist of blowing steam into the acid solution covering the charcoal through a perforated iron pipe submerged in the solution. The steam thus provides the desired heat and agitation while the iron for the reaction is obtained from the pipe. The iron being in a massive condition does not become mixed with the other solid materials and thus avoids the difficulties which would arise from separating finely divided metallic iron from the other materials.

As an example of actual results obtained from the process as thus described, I have adsorbed 1000 mgm. of iodine in activated charcoal and then treated the charcoal with dilute sulphuric acid in the presence of iron; and after filtering out the charcoal and washing it three or four times with water the resulting wash water and acid solution was found to contain over 990 mgm. of iodine in the form of ferrous iodide.

I claim:

1. The process of recovering iodides from adsorptive charcoal containing iodine which consists of submerging the charcoal in a dilute solution of sulphuric acid and blowing steam into the solution through a perforated iron pipe submerged in the solution, thereby converting the iodine to ferrous iodide, and washing the ferrous iodide from the charcoal.

2. The process of recovering iodides from adsorptive charcoal containing iodine which consists of treating the charcoal with an acid and a metal having the characteristic reaction of converting the iodine into a water soluble iodide of the metal, said treatment including heating the acid through a pipe formed of the metal and submerged in the acid, and washing the resulting metal iodide from the charcoal.

3. The process of recovering iodides from adsorptive charcoal containing iodine which consists of treating the charcoal with an acid and a metal having the characteristic reaction of converting the iodine into a water soluble iodide of the metal, said treatment including introduction of an agitating fluid into the acid through a pipe formed of the metal and submerged in the acid, and washing the resulting metal iodide from the charcoal.

4. The process of recovering iodides from adsorptive charcoal containing iodine which consists of submerging the charcoal in a dilute solution of sulphuric acid and introducing steam into the solution through an iron pipe submerged in the solution, thereby converting the iodine to ferrous iodide, and washing the ferrous iodide from the charcoal.

In testimony whereof he has affixed his signature to this specification.

CHARLES W. GIRVIN.